US009307406B2

(12) United States Patent
Park et al.

(10) Patent No.: US 9,307,406 B2
(45) Date of Patent: Apr. 5, 2016

(54) APPARATUS AND METHOD FOR AUTHENTICATING ACCESS OF A MOBILE STATION IN A WIRELESS COMMUNICATION SYSTEM

(71) Applicant: Samsung Electronics Co., Ltd., Suwon-si, Gyeonggi-do (KR)

(72) Inventors: Jung-Shin Park, Seoul (KR); Yegin Alper, Istanbul (TR); Dae-Gyun Kim, Seongnam-si (KR); Won-Il Roh, Yongin-si (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/268,453

(22) Filed: May 2, 2014

(65) Prior Publication Data
US 2014/0331303 A1 Nov. 6, 2014

(30) Foreign Application Priority Data

May 6, 2013 (KR) ........................ 10-2013-0050774

(51) Int. Cl.
*H04W 12/06* (2009.01)
*H04L 29/06* (2006.01)
*H04W 36/00* (2009.01)

(52) U.S. Cl.
CPC ........... *H04W 12/06* (2013.01); *H04L 63/0853* (2013.01); *H04W 36/0038* (2013.01)

(58) Field of Classification Search
CPC ............. H04W 12/06; H04W 36/0038; H04L 63/0853
USPC .......................................... 726/10
See application file for complete search history.

(56) References Cited

U.S. PATENT DOCUMENTS

| 7,430,606 B1* | 9/2008 | Meandzija et al. ........... 709/229 |
| 7,496,755 B2* | 2/2009 | Genty et al. ................... 713/170 |
| 2005/0086468 A1* | 4/2005 | Meandzija et al. .......... 713/156 |
| 2008/0089294 A1 | 4/2008 | Shon et al. |
| 2009/0222902 A1 | 9/2009 | Bender et al. |
| 2010/0241756 A1* | 9/2010 | Lee et al. ....................... 709/229 |
| 2011/0265159 A1* | 10/2011 | Ronda et al. ....................... 726/6 |
| 2014/0120874 A1 | 5/2014 | Kang et al. |
| 2014/0165147 A1* | 6/2014 | Hershberg et al. ................. 726/4 |

FOREIGN PATENT DOCUMENTS

| KR | 10-2008-0033763 A | 4/2008 |
| KR | 10-2009-0059480 A | 6/2009 |
| KR | 10-2009-0075351 A | 7/2009 |
| KR | 10-2014-0052768 A | 5/2014 |

* cited by examiner

Primary Examiner — Michael S McNally
(74) Attorney, Agent, or Firm — Jefferson IP Law, LLP

(57) ABSTRACT

An apparatus and a method for access authentication of a mobile station in a wireless communication system are provided. The method includes receiving a session certificate for the access authentication from a core network, transmitting the session certificate to a new access network during a handover to the new access network, and receiving an authentication result based on the session certificate from the new access network.

29 Claims, 6 Drawing Sheets

APPARATUS AND METHOD FOR AUTHENTICATING ACCESS OF A MOBILE STATION IN A WIRELESS COMMUNICATION SYSTEM

CROSS-REFERENCE TO RELATED APPLICATION(S)

This application claims the benefit under 35 U.S.C. §119 (a) of a Korean patent application filed on May 6, 2013 in the Korean Intellectual Property Office and assigned Serial number 10-2013-0050774, the entire disclosure of which is hereby incorporated by reference.

TECHNICAL FIELD

The present disclosure relates to an apparatus and a method for authorizing a mobile terminal in a wireless communication system. More particularly, the present disclosure relates to an apparatus and a method for authorizing access of a mobile terminal.

BACKGROUND

Security of wireless networks is ensured by using encryption methods. A Mobile Station (MS) which tries to access a network has to perform a mutual password authenticating procedure with the network. The MS and the network may perform the mutual password authenticating procedure by using long-term credentials (e.g., a user ID-password pair, X.509 certificate, a SIM card, and the like). The long-term credential is stored and managed in a server located in a Core Network (CN) of the MS and an operator of the network.

The server managing the long-term credential is known as an authentication, authorization, and accounting server (3A server). The 3A server located in a home network of the MS is known as a home authentication, authorization, and accounting server (H3A server). An access authentication procedure of the MS in the network is performed by a signaling of authentication related information between the MS and the H3A. Hereinafter, the 3A server or the H3A server will be generally referred to as an authentication server.

In the authentication procedure based on a type of the long-term credential, a round-trip signaling may be processed between the MS and the authentication server twice or more. In the authentication procedure, end-points in the network are authenticated, and also authorization parameters are transmitted to an Access Network (AN) which the MS tries to access.

The authorization parameters include information such as a type of IP service (e.g., IPv4 and IPv6), a type of mobility service (e.g., full mobile, nomadic, and fixed), IP addresses allocated to the MS, allocated home agents, service quality parameters, session lifetime, and the like. The AN requires the above-mentioned information in order to provide an authorized service including the authorization parameters to the MS.

The mutual authentication procedure between the MS and the authentication server may be performed in the network for a long period of time. A messaging for the mutual authentication procedure may enable two or more round-trips between the end-points based on an authentication scheme to be used.

For example, authentication and key agreement based authentication prescribed in RFC provisions may perform the round-trip twice, and transparent layer security based authentication may carry out the round-trip ten times or more if large certificate chains are used. Further, every round-trip between the MSs may be changed based on a topographical separation for several tens of ms to several hundred ms. Recently, an intercontinental round-trip latency generally is, for example, 500 ms. Therefore, the mutual authentication procedure may be delayed for 1 sec or more, and this delay causes a degradation of a service quality.

FIG. 1 is a block diagram illustrating a network access authentication/authorization operation in an initial network entry of an MS in a wireless communication system according to the related art.

The network access authentication/authorization operation of FIG. 1 may be performed even in the case where re-authentication/re-authorization is required according to expiration of the session lifetime in the network. Hereinafter, the network access authentication/authorization is referred to as network access authentication or access authentication for convenience of the description.

In operation 101 of FIG. 1, the MS 110 transmits an identifier of a corresponding MS 110 to an AN 130a at an initial entry into the network. The AN 130a may be a Base Station (BS) or a combination of the BS and an Access GateWay (AGW). In operation 103, the AN 130a transfers the identifier of the MS 110 to the CN 150 to which an authentication server managing parameters for the access authentication of the MS 110 belongs, and requests the access authentication of the MS 110. The CN 150 performs a crypto-handshake procedure for mutual authentication, and in operation 105, as the result of the access authentication of the MS 110, transfers authorization parameters to the AN 130a which the MS 110 tries to access. The authorization parameters are used for the session authorization. In operation 107, the AN 130a transfers some parameters among the authorization parameters, which are used in the MS 110, to the MS 110.

FIG. 2 is a block diagram illustrating a network access authentication operation in the wireless communication system when an MS performs a handover to a new AN (i.e., a target AN) according to the related art.

Referring to FIG. 2, the MS 110 transmits an identifier of the corresponding MS 110 to the target AN 130b for the access authentication in operation 201. The target AN 130b may be the BS or a combination of the BS and an AGW. In operation 203, the target AN 130b transfers the identifier of the MS 110 to the CN 150b to request the access authentication of the MS 110. Here, the CN 150b may be a CN which belongs to authentication server managing the parameters for the access authentication of the MS 110, an AN which the MS 110 previously accesses, an intermediary 3A node, or the like. The CN 150b performs a crypto-handshake procedure for the mutual authentication with the MS 110 in an identical manner as the access authentication procedure for the initial network entry in FIG. 1, and, as the result of the access authentication of the MS 110, transfers the authorization parameters to the target AN 130b which the MS 110 tries to access in operation 205. In operation 207, the AN 130b transfers some parameters among the authorization parameters, which are used in the MS 110, to the MS 110.

Like the conventional access authentication procedure of FIG. 2, the MS is required to transfer a signaling for the access authentication to another network such as the CN, the previous AN, intermediary 3A node, or the like, even when the MS initially accesses the network and when the MS performs the handover. However, a time delay occurring due to the access authentication during the handover may cause an interruption of a service or a degradation of a service quality. For example, the interruption of the service such as a dropped voice call or an interrupted video streaming may occur due to the time delay during the handover of the MS.

Accordingly, provide an apparatus and a method for authenticating access of a mobile station, which are capable of reducing a time for access authentication during a handover in a wireless communication system is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for authenticating access of a mobile station, which are capable of reducing a time for access authentication during a handover in a wireless communication system.

Another aspect of the present disclosure is to provide an apparatus and a method for authenticating access authentication of a mobile station, in which a signaling to another network node such as a core network is not required in an access authentication procedure during a handover in a wireless communication system.

In accordance with an aspect of the present disclosure, a method for access authentication of a mobile station in a wireless communication system is provided. The method includes receiving a session certificate for the access authentication from a core network, transmitting the session certificate to a new access network during a handover to the new access network, and receiving an authentication result based on the session certificate from the new access network.

In accordance with another aspect of the present disclosure, a mobile station for performing access authentication in a wireless communication system is provided. The mobile station includes a transmission and reception unit configured to transmit and receive messages for the access authentication through a wireless network and a controller configured to receive a session certificate for the access authentication from a core network through an exchange of a message for the access authentication, to transmit the session certificate to a new access network during a handover to the new access network, and to receive an authentication result based on the session certificate from the new access network.

In accordance with still another aspect of the present disclosure, a method of authenticating access of a mobile station in a wireless communication system is provided. The method includes determining whether a session certificate for the access authentication is received from the mobile station during a handover of the mobile station and performing an authentication operation which is based on the session certificate to transmit an authentication result to the mobile station, when the session certificate is received.

In accordance with still another aspect of the present disclosure, an access network for authenticating access of a mobile station in a wireless communication system is provided. The access network includes a transmission and reception unit configured to transmit and receive messages for the access authentication through a wireless network and a controller configured to determine whether a session certificate for the access authentication is received from the mobile station when a handover of the mobile station occurs, and to perform an authentication operation based on the session certificate to transmit an authentication result to the mobile station if it is determined that the session certificate is received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
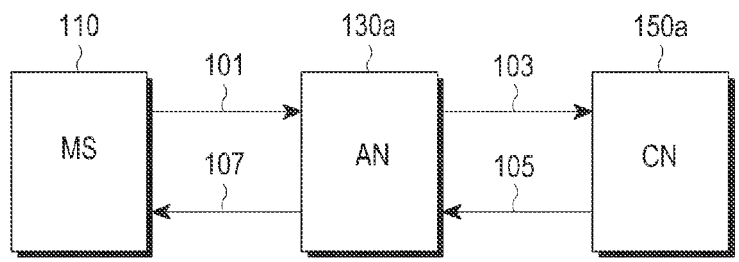
FIG. 1 is a block diagram illustrating a network access authentication operation in an initial network entry of an Mobile Station (MS) in a wireless communication system according to the related art.
Figure 2:
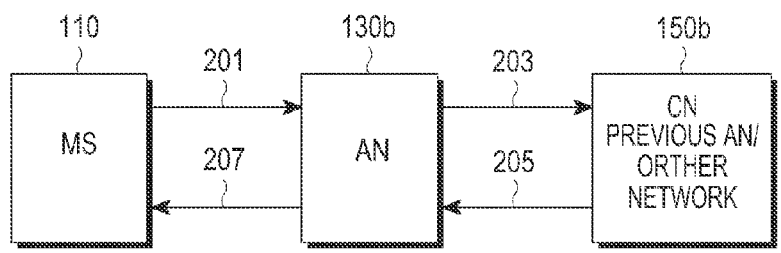
FIG. 2 is a block diagram illustrating a network access authentication operation in the wireless communication system when an MS performs a handover to a new Access Network (AN) according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of various embodiments of the present disclosure, a detailed description of known functions and/or configurations incorporated herein will be omitted when it is determined that the detailed description thereof may unnecessarily obscure the subject matter of the present disclosure.

The embodiment of the present disclosure proposes a scheme in which the Core Network (CN) creates additional authorization parameters relating to the MS for the access authentication of the Mobile Station (MS). Here, the additional authentication parameters include a session certificate continuously used in different ANs for a desired term. When a handover of the MS from a source Access Network (AN) to a target AN occurs, the session certificate is previously transferred from the CN (e.g., a 3A server or an H3A server which acts as an authentication server) to the MS in order to perform continuous access authentication of the MS in an initial network entry of the MS or re-authentication of the MS.

By using the session certificate, it is possible to omit a conventional access authentication operation passing through the CN for a session lifetime defined in the session certificate when the MS accesses the AN. Further, during the handover of the MS, the target AN may acquire the authorization parameters for the MS by using the session certificate. In this event, according to the embodiment of the present disclosure, the target AN may not require any signaling for the access authentication of the MS and the CN, and thus a delay occurring during the handover of the MS in the conventional authentication procedure may be remarkably reduced.

Figure 3:
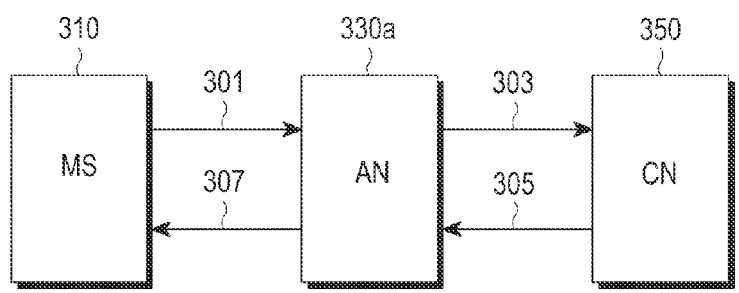
FIG. 3 is a block diagram illustrating a network access authentication operation in an initial network entry of an MS in a wireless communication system according to an embodiment of the present disclosure.

FIG. 3 is a block diagram illustrating a network access authentication operation in an initial network entry of an MS in a wireless communication system according to the embodiment of the present disclosure.

Referring to FIG. 3, the MS 310 transmits an identifier of the corresponding MS 310 to an AN 330a at an initial entry into the network. The AN 330a may be a Base Station (BS) or a combination of the BS and an Access GateWay (AGW). In operation 303, the AN 330a transfers the identifier of the MS 310 to the CN 350 to which an authentication server managing parameters for the access authentication of the MS 310 belongs to make a request for the access authentication of the MS 310, and the CN 350 performs a crypto-handshake procedure for mutual authentication with the MS 310. According to the embodiment of the present disclosure and the CN 350 creates the session certificate of the MS 310 which is continuously used in different ANs for a predetermined term. In operation 305, the CN 350 transfers the session certificate and the authorization parameters to the AN 330a, as the result of the access authentication of the MS 310. In operation 307, the AN 130a transfers some parameters among the authorization parameters, which are used in the MS 310, and the session authentication to the MS 310.

Figure 4:
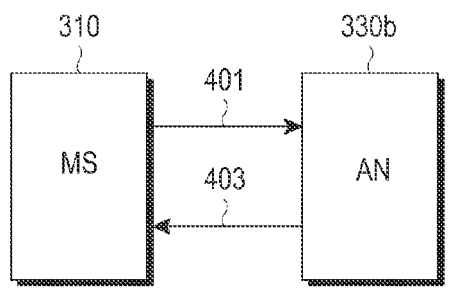
FIG. 4 is a block diagram illustrating a network access authentication operation in a wireless communication system when an MS performs a handover to a new AN according to an embodiment of the present disclosure.

FIG. 4 is a block diagram illustrating a network access authentication operation in a wireless communication system when a handover of an MS to a new AN is performed according to the embodiment of the present disclosure.

Referring to FIG. 4, in operation 401, the MS 310 transmits the session certificate received from the CN 350 of FIG. 3 to the target AN 330b for the access authentication in the initial entry into the network or in re-authentication. The target AN 330b may be a BS or a combination of the BS and an AGW. In operation 403, the target AN 330b receiving the session authentication performs the access authentication of the MS 310 by using the session authentication even though the signaling for the access authentication to another network node such as the CN and the like is not performed, and transmits the authentication access (e.g., success), to the MS 310. Further, the AN 330b may acquire the authorization parameters for the MS 310 from the session authentication. The session certificate includes the parameters to be used in the MS, and use of the corresponding parameters is authorized through the access authentication using the session certificate.

As shown in FIG. 4, according to the embodiment of the present disclosure, the MS using the session certificate may omit the signaling procedure to the CN and the like for the access authentication in the handover to the target AN, and thus a time delay occurring in the access authentication may be remarkably reduced.

Figure 5:
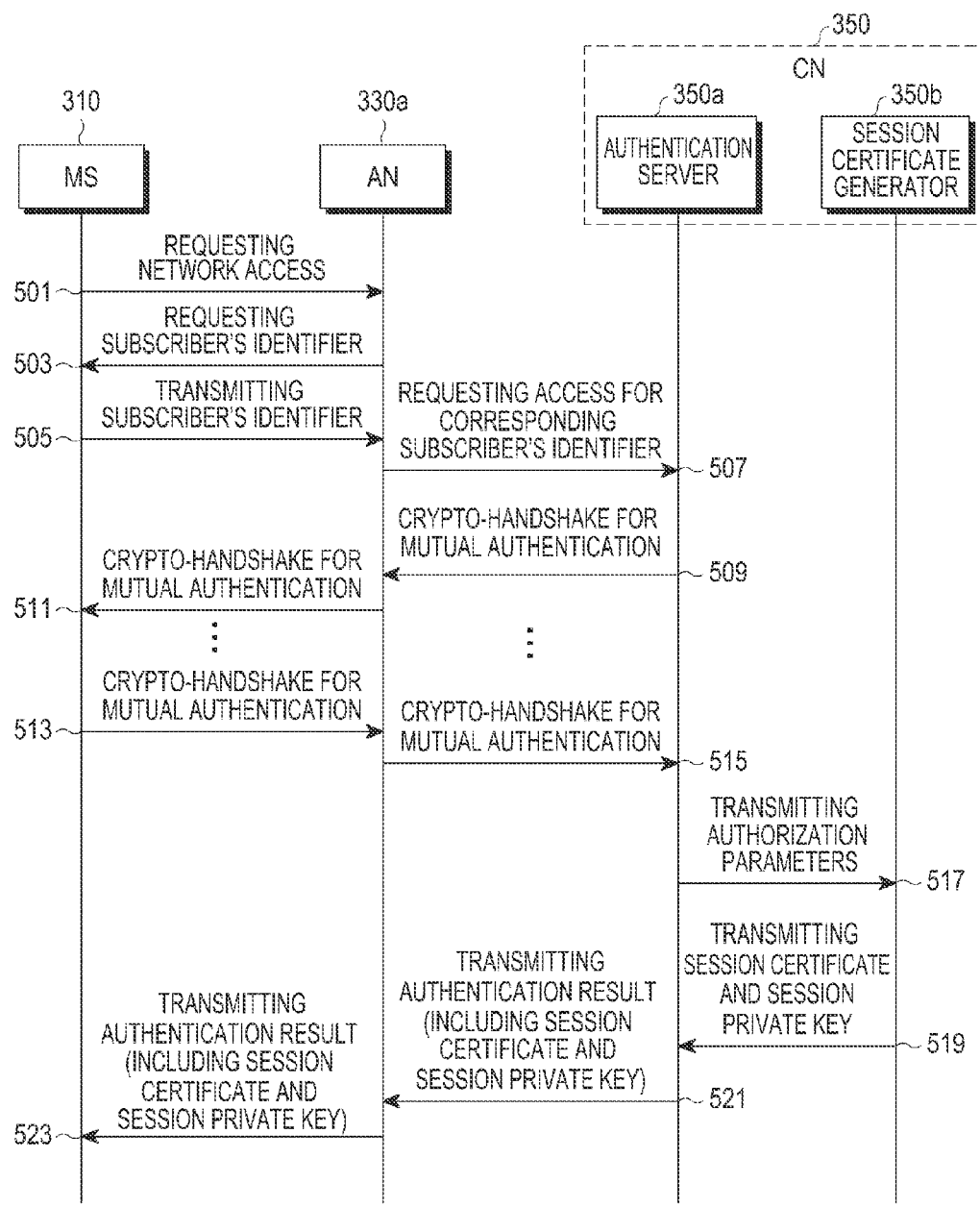
FIG. 5 is a flow diagram illustrating a network access authentication operation in an initial network entry of an MS in the wireless communication system according to an embodiment of the present disclosure.

FIG. 5 is a flow diagram illustrating a network access authentication procedure in the initial entry of an MS into a network in a wireless communication system according to the embodiment of the present disclosure.

Referring to FIG. 5, operations of operations 501, 503, 505, 507, 509, 511 and 515 in which the MS 310 makes a request for network access to the AN 330a in the initial entry of the MS 310 into the network, transfers a subscriber identifier of the MS 310 to the CN 350 through the AN 330a, and a crypto-handshake for mutual authentication of the MS 310 and the CN 350 is performed are identical to those in the conventional access authentication procedure. For example, the MS 310 transmits a request for the network access of operation 501, thereby expressing an intention to enter the network. For example, the MS 310 may select a transmission of the network access request in an unsolicited manner without any external trigger, or transmit the network access request in response to another message transmitted by the network. In the embodiment of the present disclosure, both manners may be used. Referring to FIG. 5, further, a plurality of crypto-handshake messages for the mutual authentication are transmitted and received between operations 511 and 513, or the mutual authentication may be performed through an exchange of messages of operations 511 and 513.

On the other hand, according to the embodiment of the present disclosure, the CN 350 may include an authentication server 350a such as a 3A server or an H3A server and a session authentication generator 350b for generating the session certificate according to the present disclosure, as shown in FIG. 5. Alternatively, the session certificate generator 350b may be implemented with a separate network entity separated from the CN 350. According to the process, the authentication server 350a performing the mutual authentication with the MS 310 transfers the authorization parameters for network access session authorization of the MS 310 to the session certificate generator 350b in operation 517. In operation 519, the session certificate generator 350b generates and transfers the session certificate and a session private key to the authentication server 350a, based on the authorization parameters. In operation 521, the authentication server 350a of the CN 350 transfers the authentication result including the session certificate of the MS 310 and the authorization parameters to the AN 330a. In operation 523, the AN 330a transfers some parameters among the authorization parameters, which are used in the MS 310, and the session certificate to the MS 310, and completes the access authentication operation.

According to the embodiment of the present disclosure, the authorization parameters may be identical to the authorization parameters which the CN transfers to the AN in the conventional access authentication procedure. The authorization parameters may include, for example, at least one of a type of an IP service (e.g., IPv4, IPv6 and the like), a type of a mobility service (e.g., full mobile, nomadic, fixed, and the like), allocated IP addresses, allocated home agents, service quality parameters, and session lifetime.

In the embodiment of the present disclosure, as the session certificate, a digital certificate (e.g., X.509 certificate prescribed in RFC provisions), including a plurality of attributes and digitally signed by an operator of the CN may be used. The attributes of the session certificate include, for example, at least one of a 3A session ID, a session public key, a list of network authorization parameters, a certificate lifetime, and a digital signature. The attributes of the session certificate are merely examples, and it is noted that the present disclosure is not limited to the attributes.

In the description of the attribute of the session certificate, the 3A session ID is an identifier for specifically identifying an authenticated session between the MS and CN. The 3A session ID is used to associate future actions such as the authentic session and the accounting procedure. The 3A session ID may be omitted if it is not essential.

The session public key is a public key used when the MS encrypts and transmits the session certificate to the AN. The lifetime of the session certificate is a lifetime in which the session certificate is validly used, and may be set as a network access session lifetime authorized by the authentication server 350a. The digital signature is an encrypted signature created by an authorizer such as an operator of the CN.

In the embodiment of the present disclosure, the session certificate may be provided to the MS along with a session private key. An asymmetric cryptography scheme may be used, in which the MS uses the session public key when encrypting and transmitting the session certificate to the AN while the AN uses the session private key when decrypting the session certificate received from the MS. The session private key may be generated by the session certificate generator 350b as shown in the embodiment of FIG. 5.

Although it is not shown, according to another embodiment, the session private key is not received from the CN, and may be generated by the MS. The session public key is not shared with another node, and may be strictly maintained in the MS. According to another embodiment, the session public key may be generated by the MS and transmitted from the MS to the CN by using one (e.g., a crypto-handshake message of mutual authentication), of messages transmitted and received between the MS and the CN.

When the session private key is generated by the CN and transmitted to the MS, the session private key needs to be encrypted so that none of intermediary nodes interposed between the MS and the CN may know the session private key. The encryption key known only by the MS and the CN is used to encrypt the session certificated and the session private key. The encryption key may be generated by using a long-term key shared by the MS and the CN or a session key used in the mutual authentication procedure in operations 509, 511, 513 and 515 of FIG. 5.

According to another embodiment, the encryption key may be generated from an Extended Master Session Key (EMSK) when an extensible authentication protocol based authentication framework is used. The EMSK may be validly generated between end points (i.e., MS and CN), of the authentication procedure.

According to the embodiment of the present disclosure, Equation (1) may be used to induce the encryption key Kencr used for the encryption of the session certificate and the session private key before the session certificate and the session private key are transferred to the MS.

$$K\text{encr}=\text{Hash}(\text{EMSK},\text{string}|\text{other\_parameters}) \quad \text{Equation (1)}$$

In Equation (1), Hash is a known one-way keyed hash function such as HMAC-SHA256, and a string is a fixed character string selected by an implementation of the one-way keyed hash function. An example of the string includes "Session Certificate Confidentiality Key". Further, other_parameters are additional password biding necessities based parameters. "|" indicates concatenation of adjacent values in Equation (1).

When the encryption key Kencr is calculated by using Equation (1), the CN may encrypt the session certificate and the session private key by using the encryption key Kencr of Equation (1) and a known encryption algorithm. When the MS receives the encrypted session certificate and the session private key, the MS may generate an identical encryption key Kencr by using Equation (1) and the EMSK known by the MS. The MS may decrypt the session certificate and the session private key by using the encryption key Kencr.

The transmission of the session certificate may be integrity-protected end to end between the CN and the MS. The integrity key known only by the MS and the CN is necessary for an integrity-protected procedure. The integrity-protected procedure is performed by using the long-term key shared by the MS and the CN, or a session key generated as a part of the mutual authentication between the MS and the CN.

In the case that EAP-based authentication framework is used, the integrity key may be generated from the EMSK. The EMSK is a by-product of the EAP based authentication, and is validly generated in the end-points of the certificate procedure. Equation (2) may be used to transmit the integrity key Kint, which is used for the integrity protecting the session certificate and the session public key, to the MS.

$$K\text{int}=\text{Hash}(\text{EMSK},\text{string}|\text{other\_parameters}) \quad \text{Equation (2)}$$

In Equation (2), Hash is a known one-way keyed hash function such as the HMAC-SHA256, a string is a fixed character string selected by an implementation of the one-way keyed hash function and includes "Session Certificate Confidentiallity Key" as an example, other_parameters are parameters added to Equation (2) based on the additional password binding necessities, and "|" indicates concatenation of adjacent values in Equation (2).

When the integrity key Kint is calculated by using Equation (2), the CN may generate a one-way keyed hash of a payload which includes the session certificate, the session private key (encrypted or not encrypted), and other information elements. The one-way keyed hash is included in a message transmitted from the CN to the MS. When the MS receives the payload and the one-way keyed hash, the MS may generate an identical integrity key Kint by using Equation (2) and the EMSK, and calculate a specific hash value of the payload. If the calculated specific hash value and the received hash value (i.e., the one-way keyed hash), are identical, the MS determines that the integrity of the payload is protected during the transmission. If the calculated specific hash value and the received hash value (i.e., the one-way key hash), are not identical, however, the MS determines that the integrity of the payload is not protected and abandons the payload of the message including the session certificate and the session private key received from the CN.

On the other hand, the session private key and the session certificate are proof that the MS is present in a network session of the CN, by using the authorization parameters included in the session authorization. In other words, the MS having the session private key and the session certificate need not perform the signaling with the CN for the access authentication during the handover to the target AN. That is, the MS proposes the authorization parameters by using the session certificate, and authenticates that a corresponding MS is an entity qualified for the session certificate through a password. In this case, the MS performs the strict signaling for the access authentication between the MS and the AN, and may omit the signaling between the MS and the CN. For example, an asymmetric cryptography scheme may be used, in which the MS uses the session public key when encrypting and transmitting the session certificate to the AN while the AN uses the session private key when decrypting the session certificate received from the MS.

In an example of FIG. 5, the described procedure is possible in which the authentication server 350a makes the authorization be valid in the session certificate generator 350b. The authentication server 350a may receive the session certificate from the session certificate generator 350b at a time point before the authentication for the MS is completed. When the authentication of the MS fails, the authentication server 350a may determine that the session certificate is abandoned.

In the embodiment of the present disclosure, the session certificate may have a valid lifetime. The MS or the network performs re-authentication before the session is expired or before a session causing discontinuity of the network access service. The session certificate may be generated at each time point, and the MS and the CN are mutually authenticated. In the embodiment of the present disclosure, the generation of the session certificate may be selective. Further, regular authentication and authorization using the long-term credential are still valid.

Figure 6:
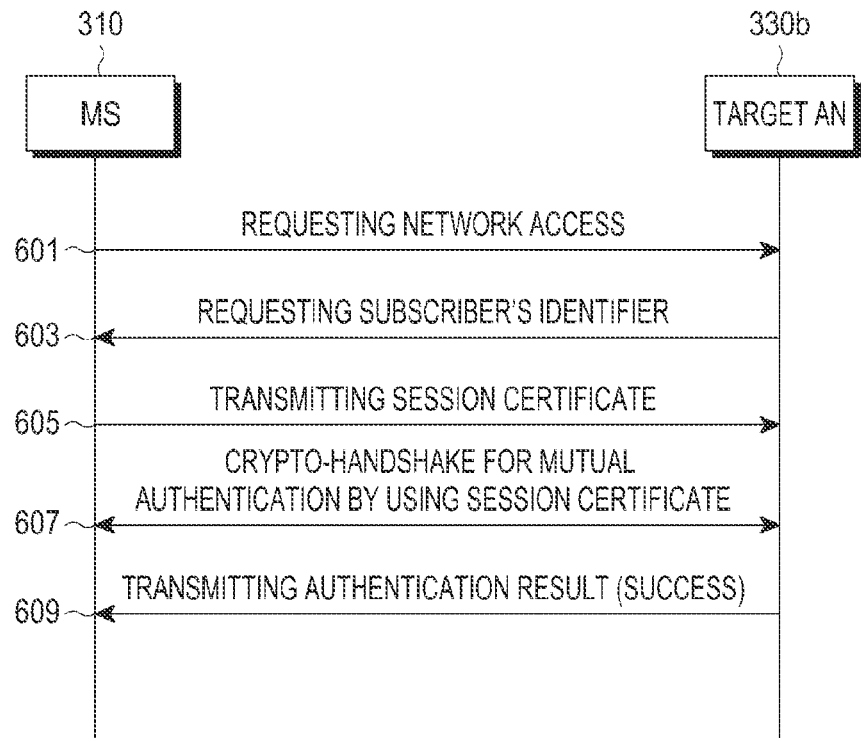
FIG. 6 is a flow diagram illustrating a network access authentication operation in a wireless communication system when an MS performs a handover to a new AN according to an embodiment of the present disclosure.

FIG. 6 is a flow diagram illustrating a network access authentication procedure during a handover of an MS to an AN (i.e., a target AN), in the wireless communication system according to the embodiment of the present disclosure, in which the operation of FIG. 4 is illustrated in detail.

Referring to FIG. 6, the MS 310 transmits a request for the network access to the target AN 330b during the handover in operation 601. The target AN 330b requests the MS 310 to transmit a subscriber's identifier for the access authentication in operation 603, and the MS 310 transmits the session certificate to the target AN 330b in operation 605. The session certificate is previously received from the CN in the initial entry into the network or the re-authentication. The target AN 330b performs the crypto-handshake for the mutual authentication by using the received session authentication in operation 607, and transmits the authentication result (success) to the MS 310 in operation 609.

In the embodiment of FIG. 6, when having the session certificate which is expired, the MS may transmit the session certificate and/or an indication of the presence of the session certificate to the target AN. This indicates a possibility that the MS performs the access authentication to the target AN by using the session certificate. Therefore, the target AN may be present in the access authentication of the MS although it may not include external network elements such as the authentication server included in the CN.

The authentication scheme used in the MS and the AN in the embodiment of FIG. 6 may be a known Transparent Layer Security (TLS) scheme. The detailed description of the TLS scheme refers to the RFC provisions. The TLS may use various versions, and further may use a certificate type credential to authenticate the end-points. While the MS uses the session certificate as the credential of the MS, the AN is also required to use the certificate. Any type of certificate verifying the authenticity of the AN may be used as the certificate of the AN. In operation 607, the certificate based TLS authentication between the MS and the AN may be performed, and the operation 607 may include a plurality of round trips between the end-points. If the session certificate is not transmitted in operation 605, the MS may present the session certificate to the AN in operation 607.

In the authentication procedure using the TLS scheme, the AN may achieve the authentication of the MS (while the MS may achieve the authentication of the AN (i.e., mutual authentication)), and also acquire the authorization parameters from the session certificate of the MS. Accordingly, the AN may provide service to the MS even though it may not download the authorization parameters from the CN or any external network entity.

When the AN is absent at a position where a service is provided by using the authorization parameters acquired from the session certificate, the AN may select a downgrade of the authorization parameters. The authorization parameters which are downgraded and corrected as described above may be transmitted to the MS in operation 609 of FIG. 6. The MS may correct the authorization parameters so that the correction of the authorization parameters is applicable to only a corresponding AN.

The service downgrade may be facilitated through the correction of the authorization parameters, for example, only IPv4 service is provided although the session certificate proposes the authorization for the IPv4 and IPv6 services. However, the service upgrade may not be preferred, for example the IPv4 and IPv6 services are provided although the session certificate proposes the authorization for only the IPv4 service. However, some network arrangements may have valid reasons for allowing the upgrade.

Figure 7:
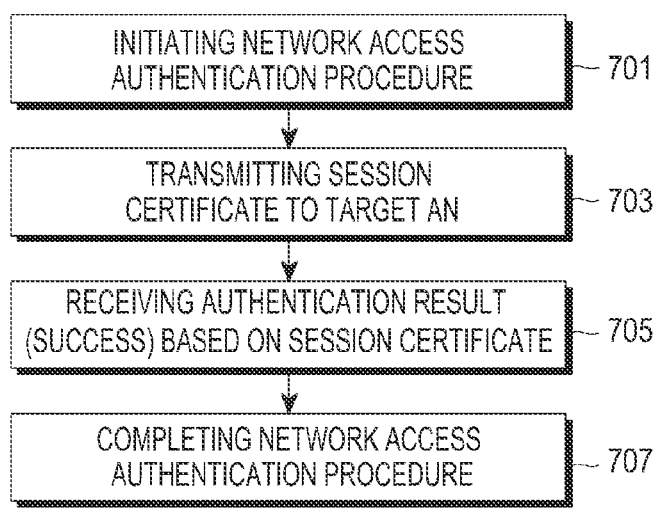
FIG. 7 is a flowchart illustrating an access authentication procedure performed by an MS during a handover according to an embodiment of the present disclosure.

FIG. 7 is a flowchart illustrating an access authentication procedure executed by the MS during the handover according to the embodiment of the present disclosure, in which it is assumed that the MS previously receives and has a valid session certificate, which is not expired, from the CN.

Referring to FIG. 7, the MS initiates the network access authentication procedure when the handover to the target AN occurs, in operation 701. In operation 703, the MS transmits the session certificate to the target AN, and in operation 705, the MS receives the authentication result (success), which is based on the session certificate, from the AN. In operation 707, the network access authentication procedure is completed. Through the operations of FIG. 7, the MS performs the access authentication by using a plurality of different ANs and the session certificate during a valid lifetime of the session certificate. In this case, the signaling with the CN such as the conventional access authentication is not required.

Figure 8:
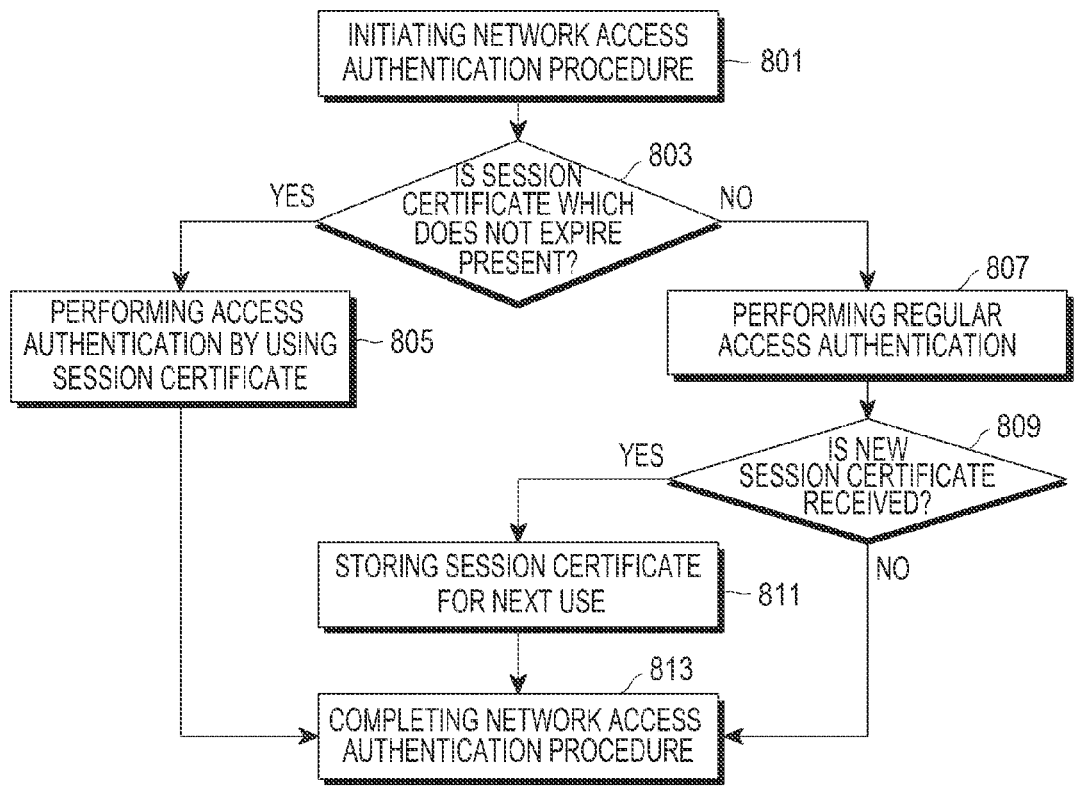
FIG. 8 is a flowchart illustrating an access authentication procedure performed by an MS according to an embodiment of the present disclosure.

FIG. 8 is a flowchart illustrating the access authentication procedure performed by the MS according to the embodiment of the present disclosure, in which cases that the access authentication using the session certificate and the regular access authentication are performed are distinctively illustrated.

Referring to FIG. 8, the network access authentication procedure is initiated in operation 801. The access authentication procedure is initiated by the MS or the AN. In operation 803, it is determined whether the MS has the session certificate which is not expired. If it is determined that the MS has the session certificate which is not expired and valid, the MS proceeds to operation 805 to transmit the session certificate to the AN, thereby performing the access authentication using the session certificate. On the other hand, if the session certificate which is not expired is absent in operation 803, the MS proceeds to operation 807 and performs the regular access authentication procedure as shown in FIG. 5. In operation 809 and the MS determines whether a new session certificate is received from the CN through the access authentication procedure. If it is determined that the new session certificate is received, the MS proceeds to operation 811 to store the session certificate for a next use. The MS completes the network access authentication procedure in operation 813. If it is determined that the new session certificate is not received in operation 809, the MS proceeds to operation 813 to complete the access authentication procedure.

The MS transmits the session certificate to the AN to perform the access authentication in operation 805. Alternatively, as another embodiment, it is possible to perform the access authentication in a manner that the MS may not transmit the session certificate but includes a specific value in a message indicating that the MS intends to use the session certificate. In this case, the AN participates in session certificate based TLS authentication/authorization in response to the MS which transmits the message including the specific value, and/or performs regular authentication/authorization based on the long-term credential. In the embodiment of the present disclosure, on the other hand, the session certificate has a lifetime within a predetermined term, and is abandoned when the lifetime is expired.

Figure 9:
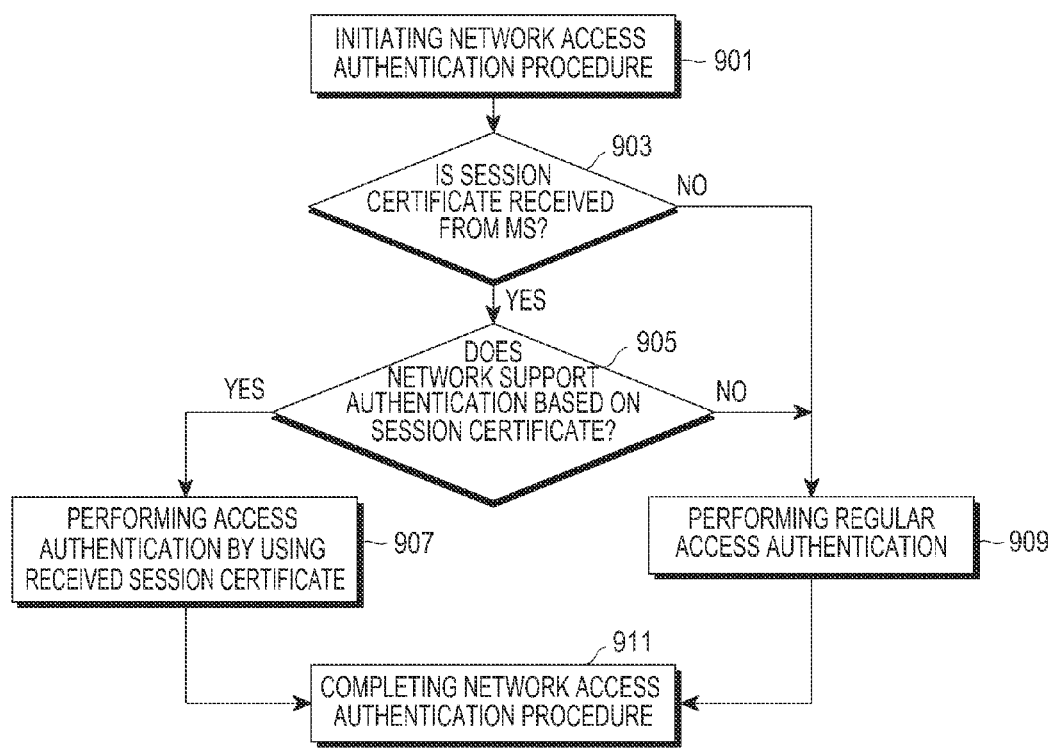
FIG. 9 is a flowchart illustrating an access authentication procedure performed by an AN according to an embodiment of the present disclosure.

FIG. 9 is a flowchart illustrating an access authentication procedure performed by an AN according to an embodiment of the present disclosure, in which an operation is performed according to whether a network (i.e., the AN), supports a session certification based authentication.

Referring to FIG. 9, the network access authentication procedure is initiated in operation 901. The access authentication procedure is initiated by the MS or the AN. In operation 903, it is determined whether the AN receives the session certificate for the access authentication. If it is determined that the session certificate is received in operation 903, proceed to operation 905 where it is determined whether the AN supports the session certificate based access authentication. Further, the session certificate based access authentication may use the TLS scheme in the embodiment. If it is determined that the AN supports the session certificate based access authentication in operation 905, the AN proceeds to operation 907 and performs the access authentication using the received session certificate.

On the other hand, if the session certificate is received from the MS in operation 903, or the AN may not support the session certificate based authentication in operation 905, the AN proceeds to operation 909 and performs a regular access authentication procedure. Through the above mentioned process, the network access authentication procedure is completed in operation 911.

Figure 10:
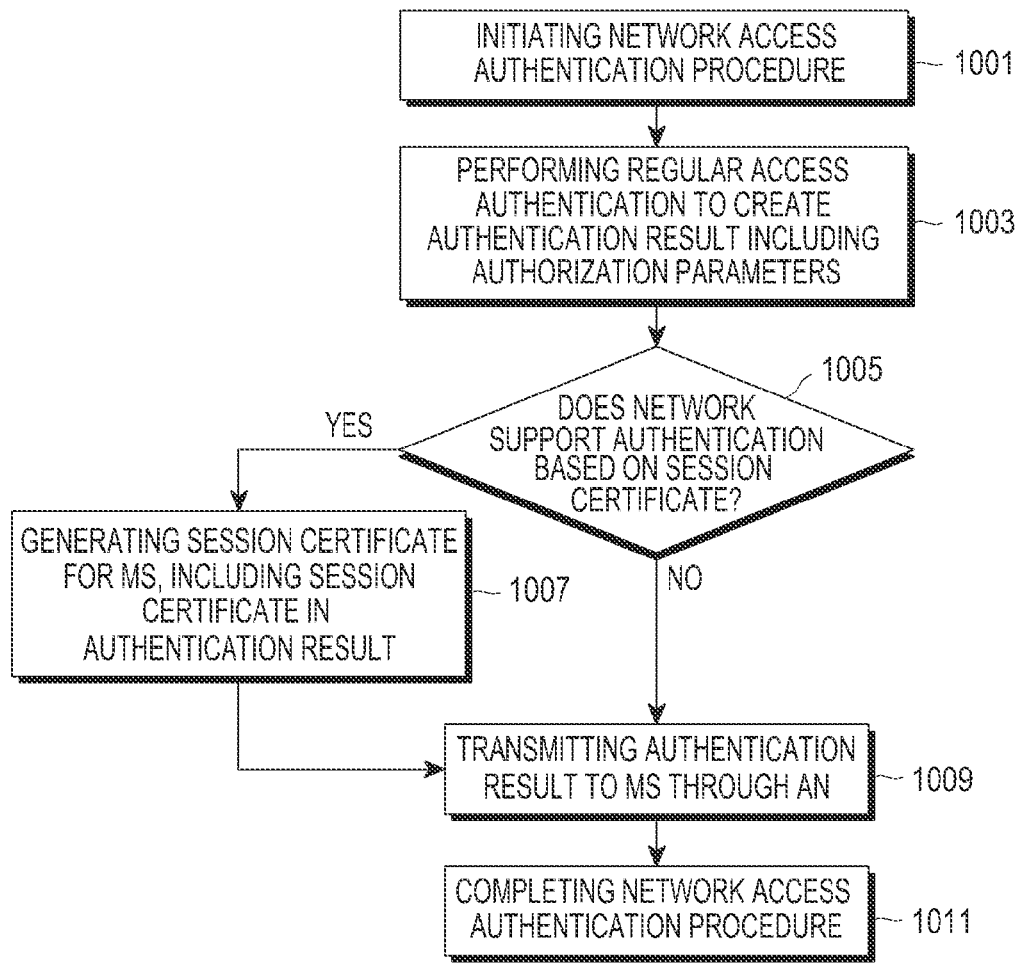
FIG. 10 is a flowchart illustrating an access authentication procedure performed by a Core Network (CN) according to the embodiment of the present disclosure.

FIG. 10 is a flowchart illustrating an access authentication procedure performed by a CN according to an embodiment of the present disclosure, in which an operation is performed according to whether an MS supports a session certificate based authentication.

Referring to FIG. 10, the network access authentication procedure is initiated in operation 1001. The access authentication procedure is initiated by the MS or the AN. If the access authentication procedure is initiated, in operation 1003, the CN firstly performs regular access authentication and creates the authentication result including the authorization parameters for the MS. In operation 1005, it is determined whether the MS supports the access authentication using the session authentication. If the MS supports the access authentication using the session authentication in operation 1005, the CN proceeds to operation 1007 and generates a session certificate for the MS through the session certificate generator and includes the session certificate in the authentication result of operation 1003. The authentication result generated in operation 1003 or 1007 is transmitted through the AN, and the network access authentication procedure of the CN is completed in operation 1011.

Although it is not shown in FIG. 10, on the other hand, when the access authentication for the MS is unsuccessful, the result of the failed access authentication procedure is transmitted to the MS. The CN may have profile information for the MS, and may previously know whether the MS supports the access authentication using the session certificate through various paths such as a separate signaling or performance information of the MS. Alternatively, the MS may require a message transmitted to the CN for the access authentication to include whether the access authentication using the session certificate is supported.

The method of authenticating the access according to the embodiment of the present disclosure may be applied to the wireless network in which the MS has mobility, in which the access authentication is performed although the signaling is performed through the CN during the handover of the MS moving to a new network, so as to reduce the time delay occurring in the access authentication.

Various aspects of the present disclosure may also be embodied as computer readable code on a non-transitory computer readable recording medium. A non-transitory computer readable recording medium is any data storage device that may store data which may be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium may also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums may also be distributed over network coupled computer systems so that the instructions are stored and executed in a distributed fashion. Also, functional computer programs, instructions, and instruction segments for accomplishing the present disclosure may be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of access authentication by a mobile station in a wireless communication system, the method comprising:
   receiving, a session certificate for the access authentication from a core network;
   transmitting the session certificate to a new access network during a handover to the new access network; and
   receiving an authentication result based on the session certificate from the new access network.

2. The method as claimed in claim 1, wherein the session certificate includes at least one of several pieces of information according to the access authentication of the mobile station.

3. The method as claimed in claim 1, wherein the session certificate is encrypted by using an encryption key known by the mobile station and the core network, and is transmitted.

4. The method as claimed in claim 1, wherein the session certificate has a lifetime within a predetermined term.

5. The method as claimed in claim 1, wherein an authentication based on the session certificate is performed by using a Transparent Layer Security (TLS) scheme.

6. The method as claimed in claim 1, wherein the receiving of the session certificate further comprises:
   receiving a session private key for a decryption of the session certificate along with the session certificate.

7. The method as claimed in claim 1, wherein each of the mobile station and the access network transmits and receives messages by using an asymmetric cryptography scheme in the access authentication.

8. A mobile station for performing access authentication in a wireless communication system, the mobile station comprising:
   a transceiver configured to transmit and receive messages for the access authentication through a wireless network; and
   a controller configured to:
      receive a session certificate for the access authentication from a core network through an exchange of a message for the access authentication,
      transmit the session certificate to a new access network during a handover to the new access network, and
      receive an authentication result based on the session certificate from the new access network.

9. The mobile station as claimed in claim 8, wherein the session certificate includes at least one of several pieces of authorization information according to the access authentication of the mobile station.

10. The mobile station as claimed in claim 8, wherein the session certificate is encrypted by using an encryption key known by the mobile station and the core network, and is transmitted.

11. The mobile station as claimed in claim 8, wherein the session certificate has a lifetime within a predetermined term.

12. The mobile station as claimed in claim 8, wherein an authentication based on the session certificate is performed by using a Transparent Layer Security (TLS) scheme.

13. The mobile station as claimed in claim 8, wherein the controller is further configured to receive a session private key for a decryption of the session certificate along with the session certificate.

14. The mobile station as claimed in claim 8, wherein each of the mobile station and the access network is configured to transmit and receive messages by using an asymmetric cryptography scheme in the access authentication.

15. A method of authenticating access of a mobile station in a wireless communication system, the method comprising:
   determining whether a session certificate for the access authentication is received from the mobile station during a handover of the mobile station, the session certificate being obtained from a core network prior to the handover; and
   performing an authentication operation which is based on the session certificate to transmit an authentication result to the mobile station, when the session certificate is received.

16. The method as claimed in claim 15, wherein the session certificate includes at least one of several pieces of authorization information according to the access authentication of the mobile station.

17. The method as claimed in claim 15, wherein the session certificate is encrypted by using an encryption key known by the mobile station and the core network, and is transmitted.

18. The method as claimed in claim 15, wherein the session authentication has a lifetime within a predetermined term.

19. The method as claimed in claim 15, wherein the performing of the authentication operation further comprises:
   performing a Transparent Layer Security (TLS) scheme based on the received session certificate.

20. The method as claimed in claim 15, further comprising: acquiring at least one of several pieces of authorization information for authenticating an access session of the mobile station to the network from the received session certificate.

21. The method as claimed in claim 15, wherein the access network transmits and receives messages to and/or from the mobile station by using an asymmetric cryptography scheme in the access authentication.

22. An access network for authenticating access of a mobile station in a wireless communication system, the access network comprising:
   a transceiver configured to transmit and receive messages for the access authentication through a wireless network; and
   a controller configured to:
      determine whether a session certificate for the access authentication is received from the mobile station when a handover of the mobile station occurs, the session certificate being obtained from a core network prior to the handover, and
      perform an authentication operation based on the session certificate to transmit an authentication result to the mobile station if it is determined that the session certificate is received.

23. The access network as claimed in claim 22, wherein the session certificate includes at least one of several pieces of authorization information according to the access authentication of the mobile station.

24. The access network as claimed in claim 22, wherein the session certificate is encrypted by using an encryption key known by the mobile station and the core network, and is transmitted.

25. The access network as claimed in claim 22, wherein the session certificate has a lifetime within a predetermined term.

26. The access network as claimed in claim 22, wherein the controller is further configured to control an operation of performing the access authentication by using a Transparent Layer Security (TLS) scheme based on the received session certificate.

27. The access network as claimed in claim 22, wherein the controller is further configured to acquire at least one of several pieces of authorization information for authenticating an access session of the mobile station to the network from the received session certificate.

28. The access network as claimed in claim 22, wherein the access network is configured to transmit and receive messages to and/or from the mobile station by using an asymmetric cryptography scheme in the access authentication.

29. A non-transitory computer-readable storage medium storing instructions that, when executed, cause at least one processor to perform a method comprising:
  receiving, by a mobile station, a session certificate for the access authentication from a core network;
  transmitting, by the mobile station, the session certificate to a new access network during a handover to the new access network; and
  receiving, by the mobile station, an authentication result based on the session certificate from the new access network.

* * * * *